May 19, 1936.　　　G. G. MORENO　　　2,041,012
LENS MOUNT
Filed July 6, 1934　　　2 Sheets-Sheet 1

Inventor
Gabriel Garcia Moreno
By Lyon & Lyon
Attorneys

May 19, 1936. G. G. MORENO 2,041,012
LENS MOUNT
Filed July 6, 1934 2 Sheets-Sheet 2

Inventor
Gabriel Garcia Moreno
By Lyon & Lyon
Attorneys

Patented May 19, 1936

2,041,012

UNITED STATES PATENT OFFICE 2,041,012

LENS MOUNT

Gabriel Garcia Moreno, Los Angeles, Calif., assignor to C M C Corporation, New York, N. Y., a corporation of Delaware Application July 6, 1934, Serial No. 733,974

11 Claims. (Cl. 88—16.6)

This invention relates to a device whereby two frames of motion picture film or any two transparencies may be simultaneously projected or projected in alternate succession upon a screen or other observation surface in such manner that the two images appear to merge and complement one another on such surface.

More particularly, the invention relates to a device for adjustably positioning two projection lens systems relatively to each other and to the plane occupied by the transparencies which are being projected.

In the preferred embodiment of the invention, the projection lens systems are preferably of large field and have been corrected for spherical aberration, coma and astigmatism, and a longitudinal segment of each lens system is cut away, the two lens systems being then held in position with the chords facing each other. These lens systems are then carried in a mounting which permits the optical axes of one of the lens systems to be moved toward or away from the other while such axes are maintained substantially parallel. Means are also provided for adjustably positioning the lens systems simultaneously around a central axis and along such central axis.

It is an object of this invention, therefore, to disclose and provide a device particularly adapted for use in the projection of film transparencies and/or cinematographic films either with or without the conjoint use of color filters.

Another object of the invention is to disclose and provide a strong, accurate mount or carriage for projection lens systems whereby the projection lens may be accurately positioned, with respect to the transparencies being projected.

A further object of the invention is to disclose and provide a lens mount adapted to suitably hold and position a pair of projection lens systems, said lens mount being readily adjustable to existing projection machines.

These and other objects, uses, advantages and adaptations of the invention will become apparent to those skilled in the art from a contemplation of the illustrative form of the invention described hereinafter in considerable detail.

In such description, reference will be had to the appended drawings, in which.

Figure 6:
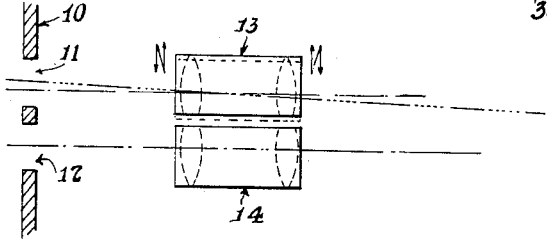
Fig. 6 is a diagrammatic representation showing another movement which can be imparted to the lenses.

As shown in Fig. 6, the device is particularly adapted for the simultaneous projection of two adjacent images on a strip of cinematographic film which is intermittently passed through the gate indicated at 10, wherein the upper frame is positioned within the aperture 11 and the lower frame within the aperture 12. The projection is accomplished through two lens systems—an upper lens system indicated at 13 and a lower lens system indicated at 14.

As stated hereinabove, each of the lens systems is preferably cut away in a plane parallel to the optical axis of the system and the chords of the two systems then face each other. As it is desired that the images projected merge with one another upon the screen or observation surface, the optical center line of the lower lens system 14 may coincide with the center of the lower image 12. The upper lens system 13, however, is positioned with its optical axis parallel to the optical axis of the lens system 14 but such optical center is spaced from the optical center of the lens system 14 a distance smaller than the distance separating the central points of the adjacent transparencies or frames 11 and 12. As a result, the image projected by the upper lens system 13 is downwardly diverted so as to become superimposed upon the image projected by the lower lens system 14.

When simultaneous projection of isomorphous images is used in the additive process of cinematography, it is essential that the images completely and accurately merge upon the observation surface, thereby preventing the formation of the so-called fringe or halation around objects recorded on the transparencies. The device of this invention provides for accurate adjustment of the upper lens system 13 with respect to the lower lens system 14.

Figure 5:
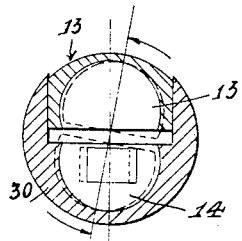
Fig. 5 is a diagrammatic representation showing the movement of the lens mount.
Figure 4:
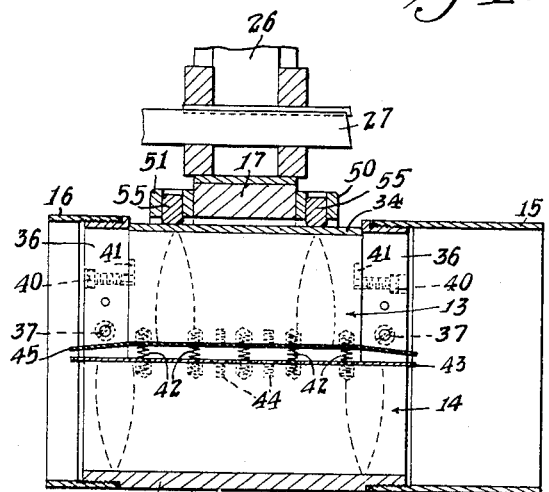
Fig. 4 is a longitudinal section, partly broken away, along the plane IV—IV of Fig. 2.

Occasionally, as illustrated in Fig. 5, the images carried by the transparencies do not have their centers in a plane passing through the optical centers of the projection lens systems. It is then desirable to shift both lens systems around a common center. The device of this invention provides ready and accurate means for so doing.

Figure 1:
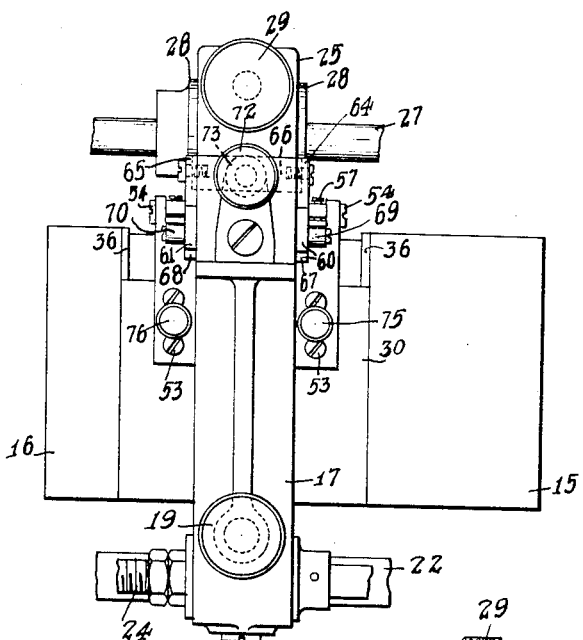
Fig. 1 is a side elevation of the device.
Figure 2:
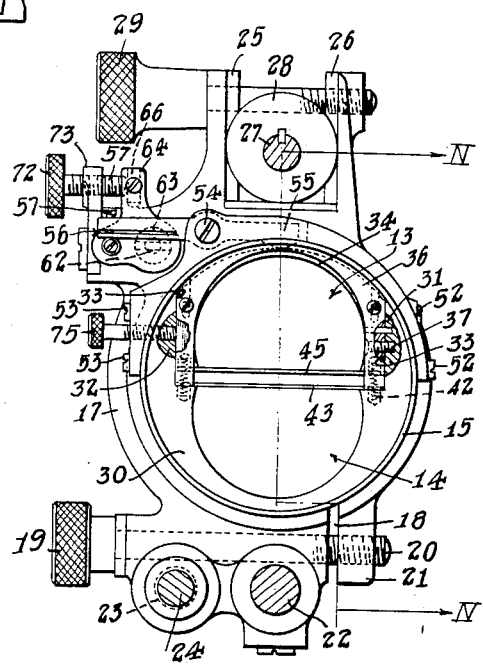
Fig. 2 is a front elevation of the device.
Figure 3:
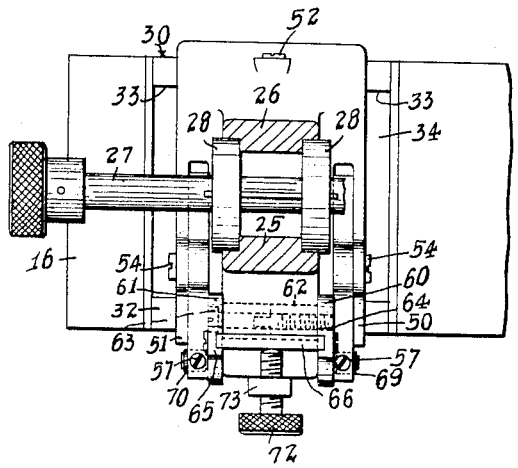
Fig. 3 is a plan view, partly broken away.

As shown in Fig. 2, the upper lens system 13 and the lower lens system 14 are carried within a U-shaped housing having a substantially cylindrical outer surface, said housing being provided with front and rear hoods 15 and 16 respectively. This cylindrical housing is held within a holder 17 which incompletely encircles the housing, being split as indicated at 18. The holder may be caused to firmly engage the housing by tightening the knob 19 which is carried on one end of a shaft provided with a threaded end 20, which end is in threaded engagement with the portion 21 of the holder 17.

The holder 17 is slidably mounted upon a guide rod 22, the axis of said rod being substantially parallel to the axes of the lens systems 13 and 14. The holder 17 may also be provided with an internally threaded bore 23 parallel to the bore in which the guide rod 22 is received, an exteriorly threaded shaft 24 cooperating with said bore 23 whereby rotation of the screw shaft 24 may move the entire holder 17 toward or away from the film gate or projection plane. The threaded shaft 24 is not fixed at its ends, thereby permitting the holder 17 to pivot upon the guide rod 22.

The upper portion of the holder 17 is provided with two upwardly extending spaced lugs 25 and 26. Another guide shaft 27 parallel to the guide rod 22 extends through the space between the lugs 25 and 26. The guide rod 27 is provided with an eccentric 28 keyed thereon, said eccentric being slidably received between the opposing surfaces of the lugs 25 and 26. Partial rotation of the guide rod 27 will therefore cause the entire holder 17 to pivot upon the lower guide rod 22. Means for locking the eccentric 28 in any desired position may be provided, such as the locking screw 29 extending through the upper ends of the lugs 25 and 26.

The lens housing comprises an upper portion and a lower portion. The lower portion, indicated at 30, is provided with a cylindrical outer surface extending beyond the diametrical plane of the cylinder so as to form the upwardly extending portions 31 and 32. These upwardly extending portions are provided with parallel, flat inner surfaces, indicated at 33. The upper portion of the lens housing comprises a member 34 adapted to be slidably received between the upwardly extending portions 31 and 32 of the lower housing 30. It is to be understood that the surfaces 33 are substantially perpendicular to the chords of the lens systems 13 and 14.

The lower lens holder 30 is slightly longer than the upper lens holder 34 and filler blocks having substantially the same cross section as the upper lens holder 34 are positioned at either end of the upper lens holder 34. A filler block is indicated at 36. This filler block is threadedly engaged to the hood member 16 so that the hood member thereby threadedly connects the filler block 36 with the end of the lower lens holder 30. After being placed in position, the hood may be locked to the filler block 36 by means of a dowel pin or a screw, such as is indicated at 37.

Each of the filler blocks is provided with a pair of screws 40 provided with pilot ends, the ends of these screws being slidably received in vertical slots 41 formed in the ends of the lens holder 34. The upper lens holder 34 is yieldably urged away from the lower holder 30 by a plurality of springs, such as 42, received in opposing recesses formed in opposing edge portions of the holders 30 and 34. The pilot-ended screw 40 engages with the bottom of the slot 41 and thereby limits the upward movement of the upper lens holder 34 while permitting some downward movement thereof.

In order to prevent light passing through one of the lens systems from being directed through the adjoining lens system, a thin plate 43 of non-actinic material may be held in contact with the upper edge of the lens system 14 by means of screws 44 extending into the shoulder of the holder 30 adjacent the vertical face 33. A similar plate 45 may be attached to the lower edges of the upper holder 34 in a similar manner.

It is to be observed that the holder 17 grips the upper surfaces of the lower holder 30 but does not grip the outer surface of the movable holder 34.

Two spaced yokes 50 and 51 connect the portions 31 and 32 of the lower housing 30, these yokes being positioned on either side of the holder 17. The yokes are connected to the members 31 and 32 by means of screws 52 and 53. Each of the yokes is provided with a boss in which there is pivoted a pin 54 carrying a lever, said lever being provided at one end with a rounded, downwardly extending protuberance 55, the opposite end of the lever being provided with a substantially horizontal slot, indicated at 56. A set screw 57 is carried near the end of the bifurcated portion of the lever. The yokes 50 and 51 are partly cut away so as to permit the end 55 of the lever to bear against the outer surface of the holder 34, at a point substantially directly above the optical center of the lens 13 carried by said holder 34. Obviously, therefore, if the outer bifurcated end of the lever is raised, the inner peen end 55 of the lever will cause the movable holder 34 to move towards the lower lens 14.

Means are provided for regulating the pressure applied to the movable housing 34 through the levers. Such means comprise a pair of cranks 60 and 61 pivotally connected at 62 to a boss formed in the holder 17. The cranks 60 and 61 may be provided with integral pins adapted to extend into a horizontal bore formed in a portion of the holder 17, one of the pins being provided with a tongue and the other with a groove so as to interlock within said bore. The two pins may then be held together so as to cause the cranks 60 and 61 to move in unison by means of a screw 63 extending axially through the pins. The upper arms 64 and 65 of the cranks 60 and 61 respectively may be joined by means of a bearing member 66. The lower arms 67 and 68 of the cranks 60 and 61 respectively may be provided with rollers or pins 69 and 70 respectively, these pins extending outwardly and being adapted to support the outer bifurcated ends of the levers. An adjustment screw 72 threadedly mounted in a lug 73 carried by the holder 17 bears against the member 66, causing both cranks 60 and 61 to simultaneously pivot and raise the outer bifurcated ends of the levers, thereby moving the holder 34 downwardly within the members 31 and 32 of the lower holder member 30.

After the upper movable holder 34 has been adjusted in the manner described hereinabove, the holder may be locked in position by means of locking screws 75 and 76 extending through the yokes 50 and 51 and through the portion 32 of the lower fixed holder 30 against the movable holder 34.

The device described hereinabove has been found eminently suited to the simultaneous projection of isomorphous images of different color value in the projection of colored motion pictures by the additive process. Both lens systems may be adjusted toward or away from the projection plane by means of the screw shaft 24 which moves the holder 17 together with the housing, lens, etc. Superimposition of the images projected through the upper and lower lenses 13 and 14 is accomplished by releasing the set screws 75 and 76 and operating the adjustment screw 72 until the upper lens system 13 is placed in the desired position with respect to the stationary lens system 14. Rotation of both lens systems about a common axis may be accomplished by releasing the thumb screw 29 and partially rotating the shaft 27 and cam 28 carried thereby.

It is therefore seen that all necessary and desirable movements are readily and accurately obtained. The device, furthermore, is applicable to all usual types of lens holders and projection machines.

Although a specific structure has been described in considerable detail, it is to be understood that numerous changes and modifications may be made. All such changes and modifications as come within the scope of the appended claims are embraced thereby.

I claim:

1. In a lens mount for projection of separate transparencies upon a single observation surface, the combination of a housing for a lens system, said housing being provided with a longitudinal groove; a secondary lens housing movably positioned in said groove, a plurality of spring means for yieldably urging said secondary housing away from the lens system of said first housing, means for limiting the outward movement of said secondary housing; a holder for said combined housings, and means carried by said holder for adjustably positioning the secondary housing with respect to said first housing.

2. In a lens mount for projection of separate transparencies upon a single observation surface, the combination of a housing for a lens system, said housing being provided with a longitudinal groove; a secondary lens housing movably positioned in said groove, means for yieldably urging said secondary housing away from the lens system of said first housing, means for limiting the outward movement of said secondary housing, a cylindrical holder for said combined housings, and means for adjustably positioning the secondary housing with respect to said first housing, said adjustable means including a lever pivotally connected to said holder, one end of said lever being in contact with said secondary lens housing, a bell crank pivotally connected to said holder, said crank having one arm in contact with the free end of said lever, and an adjustment screw cooperating with the other arm of said bell crank, whereby the pressure of the lever on said secondary housing may be readily adjusted.

3. In a lens mount for projection of separate transparencies upon a single observation surface, the combination of a housing for a lens system, said housing being provided with a longitudinal groove; a secondary lens housing movably positioned in said groove, means for yieldably urging said secondary housing outwardly away from the lens system of said first housing, means for limiting the outward movement of said secondary housing, a holder for said combined housings, and means for adjustably positioning the secondary housing with respect to said first housing, said adjustable means including a lever pivotally connected to said holder, a bell crank mounted on said holder, an adjustment screw in said holder cooperating with one arm of said bell crank, the other arm of the bell crank cooperating with one end of said lever, the other end of said lever bearing against said movable housing at a point substantially in a plane passing through the optical axes of the lens systems carried by said housings, whereby manipulation of the adjustment screw may varyingly actuate said bell crank and lever to adjustably position said secondary housing.

4. In a lens mount for projection of separate transparencies upon a single observation surface, the combination of a housing for a lens system, a secondary lens housing positioned in parallel relation to said first housing, a holder for both of said housings, means for adjustably positioning said holder and housings along the optical axes of the lens systems carried thereby, and means carried by the holder for adjustably positioning the secondary lens housing with respect to said first housing, said adjustable means including a lever pivotally connected to the said holder, a bell crank mounted on said holder, an adjustment screw in said holder cooperating with one arm of said bell crank, the other arm of the bell crank cooperating with one end of said lever, the other end of said lever bearing against said movable housing at a point substantially in a plane passing through the optical axes of lens systems carried by said housings.

5. In a lens mount for two segmental lens systems, the combination of: a U-shaped housing containing a segmental lens system, a secondary lens housing movably positioned between the arms of said U-shaped housing, opposing recesses formed in said secondary housing and U-shaped housing, spring means held in said opposing recesses and adapted to yieldably urge said secondary housing outwardly from said U-shaped housing, and means for limiting the outward movement of said secondary housing carried by said U-shaped housing.

6. In a lens mount for two segmental lens systems, the combination of: a U-shaped housing containing a segmental lens system, a secondary lens housing movably positioned between the arms of said U-shaped housing, opposing recesses formed in said secondary housing and U-shaped housing, spring means held in said opposing recesses and adapted to yieldably urge said secondary housing outwardly from said U-shaped housing, means for limiting the outward movement of said secondary housing carried by said U-shaped housing, a split holder slidably mounted upon a guide rod, and means for clamping said holder about said housings.

7. In a lens mount for two segmental lens systems, the combination of: a U-shaped housing containing a segmental lens system, a secondary lens housing movably positioned between the arms of said U-shaped housing, opposing recesses formed in said secondary housing and U-shaped housing, spring means held in said opposing recesses and adapted to yieldably urge said secondary housing outwardly from said U-shaped housing, means for limiting the outward movement of said secondary housing carried by said U-shaped housing, a split holder slidably mounted upon a guide rod, means for clamping said holder about said housings, and means carried by said holder for adjustably positioning the secondary lens housing with respect to said first housing.

8. In a lens mount for two segmental lens systems, the combination of: a U-shaped housing containing a segmental lens system, a secondary lens housing movably positioned between the arms of said U-shaped housing, opposing recesses formed in said secondary housing and U-shaped housing, spring means held in said opposing recesses and adapted to yieldably urge said secondary housing outwardly from said U-shaped housing, means for limiting the outward movement of said secondary housing carried by said U-shaped housing, a split holder slidably mounted upon a guide rod, means for clamping said holder about said housings, means carried by said holder for adjustably positioning the second lens housing with respect to said first housing, and means for pivotally adjusting said holder and housings in a plane at right angles to the axes of the lens systems.

9. In a lens mount, the combination of: a U-shaped housing provided with a segmental lens system, a secondary housing adjustably positioned between the arms of said U-shaped housing, said secondary housing carrying a second segmental lens system, a plurality of spring means positioned between said housings and adapted to yieldably urge said secondary housing outwardly away from said U-shaped housing, means for limiting said outward movement carried by said U-shaped housing, a holder adapted to removably receive said housings, a lever pivotally connected to said holder, one end of the lever being in contact with said secondary housing, a bell crank pivotally mounted on said holder, one arm of said bell crank contacting with the free end of said lever, and an adjustment screw mounted in said holder and cooperating with the other arm of said bell crank whereby the position of said secondary housing may be controlled by manipulation of said adjustment screw.

10. In a lens mount, the combination of: a U-shaped housing provided with a segmental lens system, a secondary housing adjustably positioned between the arms of said U-shaped housing, said secondary housing carrying a second segmental lens system, a plurality of spring means positioned between said housings and adapted to yieldably urge said secondary housing outwardly away from said U-shaped housing, means for limiting said outward movement carried by said U-shaped housing, a holder adapted to removably receive said housings, a lever pivotally connected to said holder, one end of the lever being in contact with said secondary housing, the other end of the lever being bifurcated and provided with means for expanding the same, a bell crank pivotally mounted on said holder, one arm of said bell crank contacting with the bifurcated end of said lever, and an adjustment screw mounted in said holder and cooperating with the other arm of said bell crank whereby the position of said secondary housing may be controlled by manipulation of said adjustment screw.

11. In a lens mount, the combination of: a U-shaped housing provided with a segmental lens system, a secondary housing adjustably positioned between the arms of said U-shaped housing, said secondary housing carrying a second segmental lens system, a plurality of spring means positioned between said housings and adapted to yieldably urge said secondary housing outwardly away from said U-shaped housing, means for limiting said outward movement carried by said U-shaped housing, a holder adapted to removably receive said housings, a lever pivotally connected to said holder, one end of the lever being in contact with said secondary housing, a bell crank pivotally mounted on said holder, one arm of said bell crank contacting with the free end of said lever, an adjustment screw mounted in said holder and cooperating with the other arm of said bell crank whereby the position of said secondary housing may be controlled by manipulation of said adjustment screw, and means for pivotally adjusting said holder in a plane transverse to said housings.

GABRIEL GARCIA MORENO.